Dec. 9, 1969  R. B. WALLIS  3,482,457
VARIABLE POWER AND VARIABLE DIRECTION ENGINE AND
SIMPLE PLANETARY PHASE CHANGING DEVICE
Filed Oct. 10, 1967

INVENTOR.
Rolland B. Wallis
BY
Ronald L. Phillips
ATTORNEY

United States Patent Office 3,482,457
Patented Dec. 9, 1969

3,482,457
VARIABLE POWER AND VARIABLE DIRECTION ENGINE AND SIMPLE PLANETARY PHASE CHANGING DEVICE
Rolland B. Wallis, La Grange Park, Ill., assignor to General Motors Corporation, Detroit, Mich., a corporation of Delaware
Filed Oct. 10, 1967, Ser. No. 674,166
Int. Cl. F16h 21/22; F03g 7/06
U.S. Cl. 74—44                3 Claims

ABSTRACT OF THE DISCLOSURE

An engine operating with the Stirling cycle has a phase changing device employing a simple planetary drive connecting the engine's power mechanism to its displacer mechanism with the planetary drive controlled by a servomotor to fix and vary the phase relation between the power and displacer mechanism.

---

This invention relates to a variable power and variable direction hot gas energy transforming device having a phase changer and more particularly to a phase changer employing a simple planetary gear set.

The power output and also the output drive direction of the Stirling cycle engine can be changed by changing the phase angle between the engine's power piston and displacer piston, the displacer piston being driven by the power piston. For example, maximum engine output power with the power take-off rotating in one direction may be obtained at a predetermined positive phase angle and by decreasing the phase angle towards zero the engine power approaches zero. When the phase angle is caused to become negative the engine's power take-off is caused to rotate in the opposite direction with the engine developing corresponding power values at corresponding phase angles. It is desirable to provide a Stirling cycle engine with a phase changer for controlling engine power from zero to maximum and changing engine output direction wherein the phase changer structure is simple and has minimum size, weight and cost without sacrifice of long phase changer life.

According to the present invention the hot gas engine has a phase changing device employing a gear train with a servomotor controlled simple planetary gear set for fixing and varying the phase relation of the engine's power mechanism and displacer mechanism. According to the preferred embodiment the power crankshaft of the engine is geared to the ring gear of the simple planetary gear set whose pinions are supported on a carrier geared to the displacer crankshaft. A servomotor operated by a hydraulic control is connected by a rack and pinion drive to the sun gear of the gear set. The gearing between the power crankshaft and the planetary gear set and between the planetary gear set and the displacer crankshaft fully offset the underdrive planetary gear ratio so that when the sun gear is held by the servomotor the overall speed and torque ratio between the power and displacer crankshaft is unity. Phase angle change is accomplished by driving the sun gear with the servomotor in either a forward or reverse direction to enforce relative motion between the power and displacer crankshaft to change the phase angle to the desired value which is fixed by again holding the sun gear with the servomotor.

An object of the present invention is to provide an improved variable power and variable direction hot gas engine.

Another object is to provide a hot gas engine having a simple planetary drive phase changer for fixing and changing the phase relation of the engine's power and displacer mechanism.

Another object is to provide a hot gas engine with a phase changer having a single planetary gear set whose input member is driven by the power crankshaft, whose output member drives the displacer crankshaft, and whose reaction member is controlled by a servomotor to fix and change the phase angle of the crankshafts.

Another object is to provide a phase changer drivingly connecting two members which are to be phased having a simple planetary gear set with one gear member geared to be driven by one of the phase members, another gear member geared to drive the other phased member and a control gear member controlled by a servomotor with the complete phase changing drive train providing an overall 1:1 speed ratio drive between the phased members when the control gear member is held by the servomotor which is also operable to drive the control gear member in either direction to increase or decrease the phase angle of the phased members between positive and negative values.

These and other objects of the invention will be more apparent from the following description and drawing in which.

Figures 1, 2:
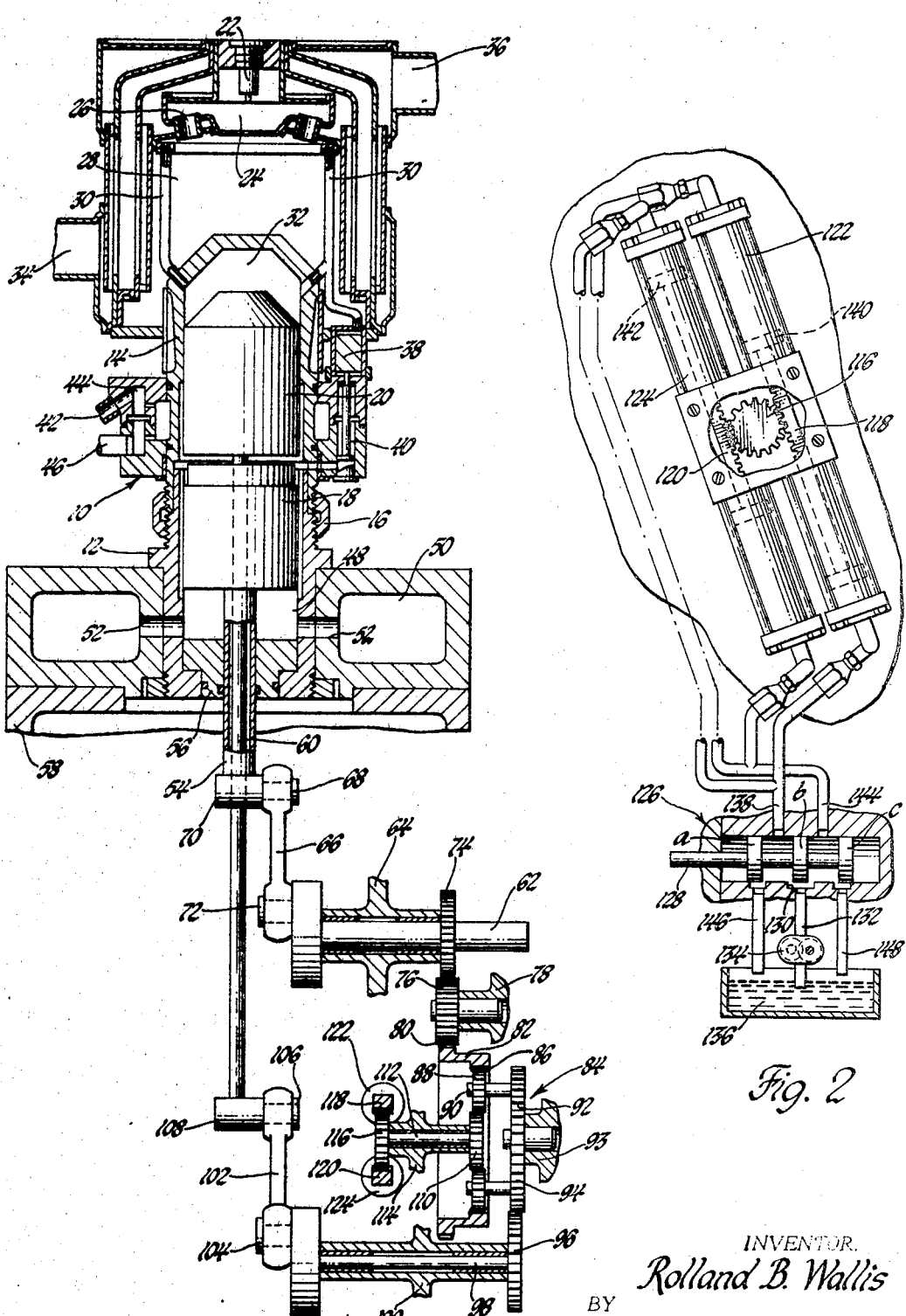
FIGURE 1 is a fragmentary cross-sectional view of a typical hot gas energy transforming device in which the phase changing device according to the present invention is employed.
FIGURE 2 is an enlarged view of the servomotor and its control system.

FIGURE 1 of the drawing illustrates a hot gas energy transforming device in the form of a Stirling cycle engine having a simple planetary phase changing device all in accordance with the present invention. The engine has a cylinder 10 which may be formed in any suitable fashion and for illustrative purposes is shown to include a lower portion 12 and an upper portion 14 secured together by a threaded ring 16. A power piston 18 is received in the cylinder 10 beneath a displacer piston 20 as in the usual construction. A burner nozzle 22 extends into a preoxidation chamber 24 which is connected by swirl passages 26 to a burner combustion chamber 28. Suitable heater tubes 30 in the combustion chamber 28 communicate with the expansion chamber 32 in the cylinder 10 above the displacer piston 20. An air inlet 34 delivers air to the combustion chamber and an exhaust outlet 36 delivers the air and products of combustion from the chamber. A suitable regenerator 38 and cooler 40 are disposed adjacent cylinder 10 for passage of the operating fluid from one end of cylinder 10 to the other end in the usual manner. A coolant inlet passage 42 conveys coolant to an annular chamber 44 communicating with the cooler 40 and a coolant outlet 46 conveys the coolant from the engine. A buffer space 48 is provided in cylinder 10 beneath the power piston 18 and in communication with an annular chamber 50 through suitable passages 52.

Power piston 18 is provided with a hollow piston rod 54 which is secured to the underside of the power piston and extends axially therefrom through a sealed closure member 56 and into the engine frame 58 which supports cylinder 10 as shown. Power piston 18 is provided with a central axial bore to permit the passage of a displacer piston rod 60 which extends axially from its connection to the underside of the displacer piston 20 through the power piston 18 and through the hollow piston rod 54 into the engine frame. This reciprocating structure is all symmetrical and coaxial about the central axis of the cylinder. The engine construction thus far described is all well known and is the usual manner of constructing an engine to operate using the Stirling cycle with a small portion of the engine power being used to power the displacer piston through a suitable drive connection between the power piston and displacer piston.

Power piston 18 is connected to drive the engine's output or power crankshaft 62 which is journaled in the web 64 of the engine frame at right angles to the central axis of the engine cylinder. The drive connection between power piston 18 and the power crankshaft 62 is provided by an oscillatory connecting rod 66 which is journaled at its upper end on a pin 68 secured to a collar 70 on the lower end of the power piston's reciprocating connecting rod 54. Connecting rod 66 is journaled at its lower end on crank pin 72 of the power crankshaft 62.

The engine's phase changing device or phase changing drive train provides a controlled simple planetary drive between the power piston 18 and the displacer piston 20 for fixing and varying the phase relationship or relative phase angle of the power and displacer mechanism. The phase changer comprises a phase changer input gear 74 which is rigidly secured to the power crankshaft 62 and in mesh with a direction reversing gear 76 journaled on engine frame web 78. Gear 76 meshes with external gear teeth 80 provided on a rotary drum 82 which is a part of a simple planetary gear set generally designated as 84. Internal gear teeth 86 on drum 82 provide the ring gear of the planetary gear set. Ring gear 86 meshes with a plurality of pinions 88 which are journaled on pinion shafts 90 secured to the gear set's carrier 92. Carrier 92 is journaled on engine frame web 93 and provided with external gear teeth 94 which mesh with a gear 96 connected to the displacer piston's crankshaft 98 which is journaled on engine frame web 100. The drive connection between the displacer crankshaft 98 and the displacer piston 20 is provided by an oscillatory connecting rod 102 which is journaled at its lower end on crank pin 104 of the displacer crankshaft 98. Connecting rod 102 is journaled at its upper end on a pin 106 which is secured to collar 108 on the lower end of the displacer piston's reciprocating connecting rod 60.

Control of the planetary gear set 84 is provided by each of the pinions 88 meshing with a sun gear 110 which is rigidly secured to a shaft 112 journaled on engine frame web 114. A pinion 116 secured to the other end of shaft 112 is in mesh at diametrically opposite sides with racks 118 and 120 which are connected to be operated by servomotors 122 and 124, respectively, as shown in both FIGURES 1 and 2.

Control of the servomotors to operate the rack and pinion drive to selectively hold the control sun gear or drive it in either one of its two rotational directions is provided by the control system comprises a pilot or control valve 126 having a valve element 128 with equal diameter lands a, b and c slidably mounted in a bore in the valve housing. A pressure port 130 connected to the valve bore as shown receives hydraulic fluid under pressure via a pressure line 132 from a pump 134 drawing from a sump 136. A line 138 continuously connects the valve bore between lands a and b to act on one piston end of the double ended pistons 140 and 142 of the servomotors 122 and 124, respectively. A line 144 continuously connects the valve bore between lands b and c to act on the opposite end of the servomotors' pistons. With valve element 128 in the position shown, central land b equally apporation the fluid pressure available at the pressure port 130 between the lines 138 and 144. Lands a and c crack the valve bore evenly between lands a and b and between lands b and c to exhaust line 146 and 148, respectively, exhausting to the sump to provide for fluid circulation while maintaining back pressure on the servomotors. Thus, the pressure on both ends of the pistons is the same thereby locking the rack and pinion drive and holding the sun gear 110 against rotation in either direction.

The pinion 116 is driven clockwise as viewed in FIGURE 2 by moving the valve element 128 to the left whereby land b widens the opening of pressure port 130 to line 144 and narrows its opening to line 138 while land c narrows the opening to exhaust line 148 and land a widens the opening to exhaust line 146. The resulting pressure differential across the pistons causes their movement in opposite directions, piston 140 downward and piston 142 upward, to correspondingly move the racks and drive the pinion 116 and connected sun gear 110. Counterclockwise rotation of pinion 116 is obtained by moving the valve element 128 off its center position to the right which is accompanied by reverse operation of the pressure and exhaust lines to effect the desired rack and pinion drive direction. The valve element 128 may be operated manually as shown or by an automatic control according to certain demand signals suited to the particular engine application.

In the arrangement shown with the input from the power crankshaft to the ring gear of the planetary gear set and carrier output to the displacer crankshaft the planetary gear set will provide a fixed torque multiplication-speed reduction drive when the sun gear is held. The gearing between the power crankshaft 62 and the ring gear 86 (gears 74, 76 and 80) and the gearing between the carrier 92 and the displacer crankshaft 98 (gears 94 and 96) have gear ratios determined to fully offset the underdrive gear ratio provided by the planetary gear set when the sun gear is held, i.e. the overall fixed speed ratio-torque ratio between the power crankshaft 62 and the displaced crankshaft 98 is 1:1.

OPERATION

When the Stirling cycle engine is operating with the control valve 128 in the center position shown in FIGURE 2 to condition the control system to hold the control sun gear 110, the underdrive ratio provided by planetary gear set with sun gear 110 acting as a stationary reaction member is exactly offset by the speed ratios of the phase changer's input and output drive to provide an overall 1:1 speed ratio drive through the phase changer between the engine's power crankshaft 62 and displacer crankshaft 98. Since the speed relationship between the power piston 18 and the displacer piston 20 is fixed there is established a fixed phase angle between the power and displacer mechanism which determines the engine output power obtained at the engine's power crankshaft 62 and also the output drive direction. To change the phase angle the valve element 128 of the pilot valve 126 is moved in either direction from its center position depending upon the phase angle change desired to enforce rotation of the control sun gear 110. Depending on whether the enforced sun gear rotation either adds to or subtracts from the input speed component of the ring gear 86 the output carrier 92 and drivingly connected displacer crankshaft 98 is caused to accordingly speed up or slow down relative to the power crankshaft 62. This operation of changing the effective speed ratio between the crankshafts enforces a phase change between the power and displacer mechanism and thus changes the output power at the engine's power crankshaft. When the phase angle establishing the desired engine output power is obtained the valve element 128 is moved back to its center position to hold the control sun gear 110 to fix the new phase angle. Assuming that the engine is operating with a positive phase angle which produces forward drive of the power crankshaft the engine output power can thus be varied in forward drive from maximum engine power to zero engine output power which occurs at zero phase angle. Reversal of the engine's output drive direction is effected by operating the phase changer under the control of pilot valve 126 to produce negative phase angles. The engine develops power values in the reverse output drive direction corresponding to those in the forward drive direction at corresponding phase angles with the desired engine operating condition maintained like in forward drive by holding the sun gear 110 to fix the phase angle at the proper value.

The above described preferred embodiment is illustrative of the invention which may be modified within the scope of the appended claims.

I claim:

1. In combination, a hot gas energy transforming device having power means and displacer means; phase changing means operatively connecting said power means to said displacer means for transmitting power to drive said displacer means and for fixing and varying the phase relationship of said power and displacer means; said phase changing means comprising a single planetary gear set having an input member, an output member and a control member, said control member being operable when held to establish a fixed speed ratio between said input member and said output member and also operable when driven to change the speed relationship of said input member and said output member, means operable to hold said control member and also operable to drive said control member, separate drive means between said power means and said input member and between said output member and said displacer means having speed ratios cooperating with the fixed speed ratio of said planetary gear set to provide an overall 1:1 speed ratio drive between said power means and said displacer means when said control member is held.

2. In combination, a hot gas energy transforming device having a power crankshaft and a displacer crankshaft; phase changing means operatively connecting said power crankshaft to said displacer crankshaft for transmitting power to drive said displacer crankshaft and for fixing and varying the phase relationship of said crankshafts; said phase changing means comprising a single planetary gear set having an input member, an output member and a control member, said control member being operable when held to establish a fixed speed ratio between said input member and said output member and also being operable when driven in one direction to increase output member speed relative to input member speed and when driven in the opposite direction to decrease output member speed relative to input member speed, means selectively operable to hold said control and drive said control member in either direction, first drive means drivingly connecting said power crankshaft to said input member, second drive means drivingly connecting said output member to said displacer crankshaft, said first and second drive means having speed ratios cooperating with the fixed speed ratio of said planetary gear set to provide an overall 1:1 speed ratio drive between said crankshafts when said control member is held.

3. In combination, a hot gas energy transforming device having a power crankshaft and a displacer crankshaft; phase changing means operatively connecting said power crankshaft to said displacer crankshaft for transmitting power to drive said displacer crankshaft and for fixing and varying the phase relationship of said crankshafts; said phase changing means comprising a single planetary gear set having a sun gear, a ring gear and a carrier rotatably supporting a pinion meshing with said sun gear and said ring gear, means operable to hold said sun gear and also operable to drive said sun gear in either direction, first gear train means drivingly connecting said power crankshaft to said ring gear, second gear train means drivingly connecting said carrier to said displacer crankshaft, said first and second gear train means and said planetary gear set having gear ratios cooperatively providing a 1:1 gear ratio between said crankshafts when said sun gear is held.

References Cited

UNITED STATES PATENTS

| 2,520,420 | 8/1950 | Marcy | 74—675 |
| 3,013,519 | 12/1961 | Wiggermann | 74—675 |
| 3,077,732 | 2/1963 | Reinhart et al. | 60—24 |
| 3,298,251 | 1/1967 | Moss | 74—675 |
| 3,302,393 | 2/1967 | Meyer et al. | 60—24 |
| 3,307,427 | 3/1967 | Turner | 74—675 |
| 3,315,465 | 4/1967 | Wallis | 60—24 |

FRED C. MATTERN, Jr., Primary Examiner

W. S. RATLIFF, Jr., Assistant Examiner

U.S. Cl. X.R.

60—24; 74—675

PO-1050
(5/69)

UNITED STATES PATENT OFFICE
CERTIFICATE OF CORRECTION

Patent No. 3,482,457        Dated December 9, 1969

Inventor(s) Rolland B. Wallis

It is certified that error appears in the above-identified patent and that said Letters Patent are hereby corrected as shown below:

Column 3, line 50, after "system" insert -- shown in Figure 2. The control system --; line 63, "apporation" should read -- apportions --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents